Figure 1:
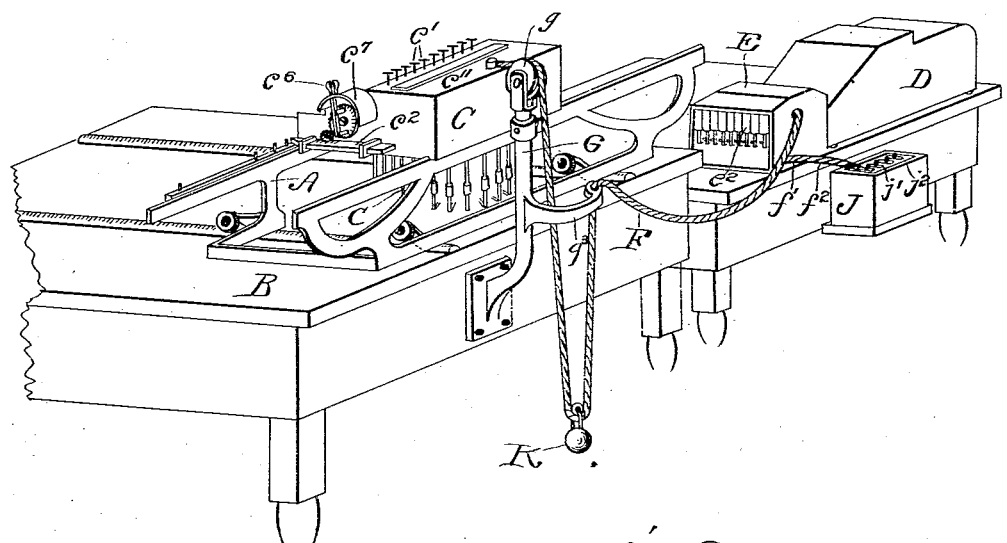

H. MARSHALL.
COMBINED TYPE WRITING AND COMPUTING MACHINE.
APPLICATION FILED APR. 8, 1902.

1,185,520.

Patented May 30, 1916.
11 SHEETS—SHEET 1.

Witnesses:
N. L. Brennan
E. B. Gilchrist

Inventor:
Holmer Marshall,
By his Attorneys,
Thurston & Bates

H. MARSHALL.
COMBINED TYPE WRITING AND COMPUTING MACHINE.
APPLICATION FILED APR. 8, 1902.

1,185,520.

Patented May 30, 1916.
11 SHEETS—SHEET 2.

Witnesses.
N. L. Bresnan
E. B. Gilchrist

Inventor.
Holmes Marshall,
By his Attorneys,
Thurston & Bates.

H. MARSHALL.
COMBINED TYPE WRITING AND COMPUTING MACHINE.
APPLICATION FILED APR. 8, 1902.

1,185,520.

Patented May 30, 1916.
11 SHEETS—SHEET 3.

Witnesses,
E. B. Gilchrist
H. W. Wise

Inventor,
Holmes Marshall,
By his Attorneys,
Thurston & Bates.

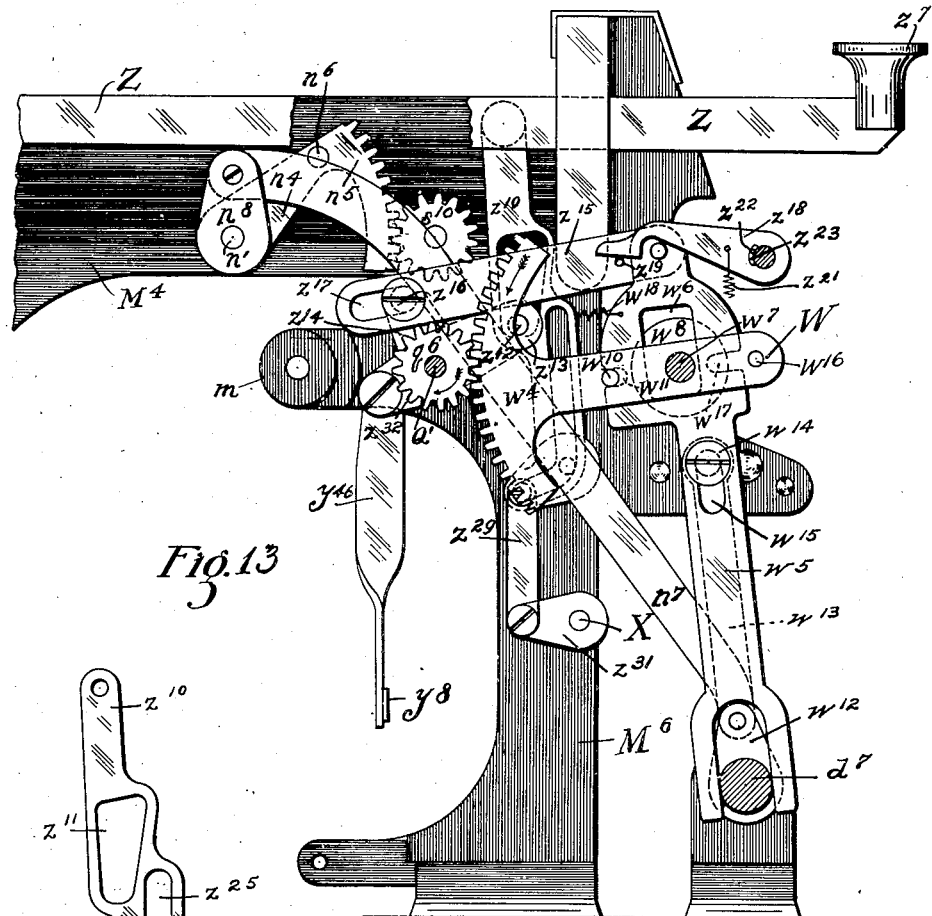

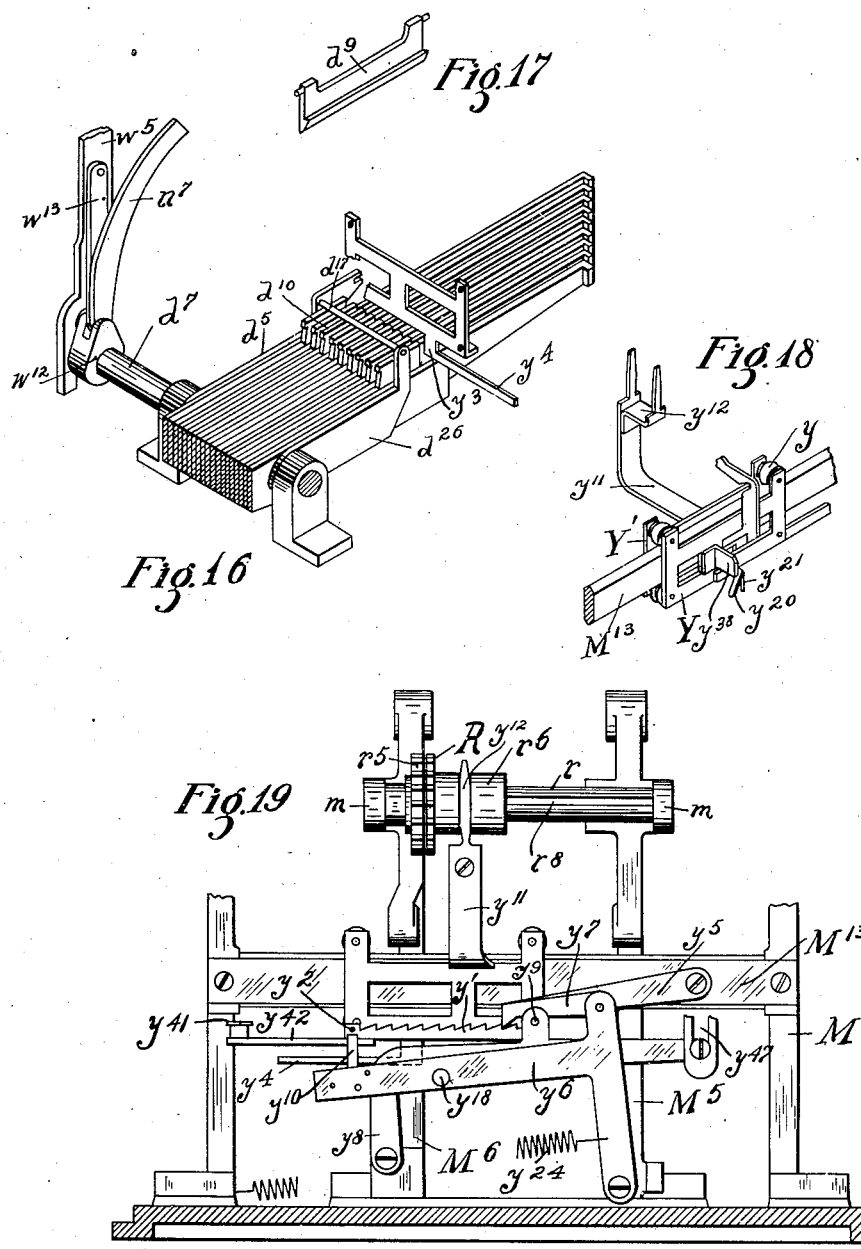

H. MARSHALL.
COMBINED TYPE WRITING AND COMPUTING MACHINE.
APPLICATION FILED APR. 8, 1902.

1,185,520.

Patented May 30, 1916.
11 SHEETS—SHEET 9.

WITNESSES:
Brennan & West.
Ludo H. Keller.

INVENTOR,
Holmes Marshall
By Bates, Fouts & Hull,
ATTYS.

H. MARSHALL.
COMBINED TYPE WRITING AND COMPUTING MACHINE.
APPLICATION FILED APR. 8, 1902.
1,185,520.
Patented May 30, 1916.
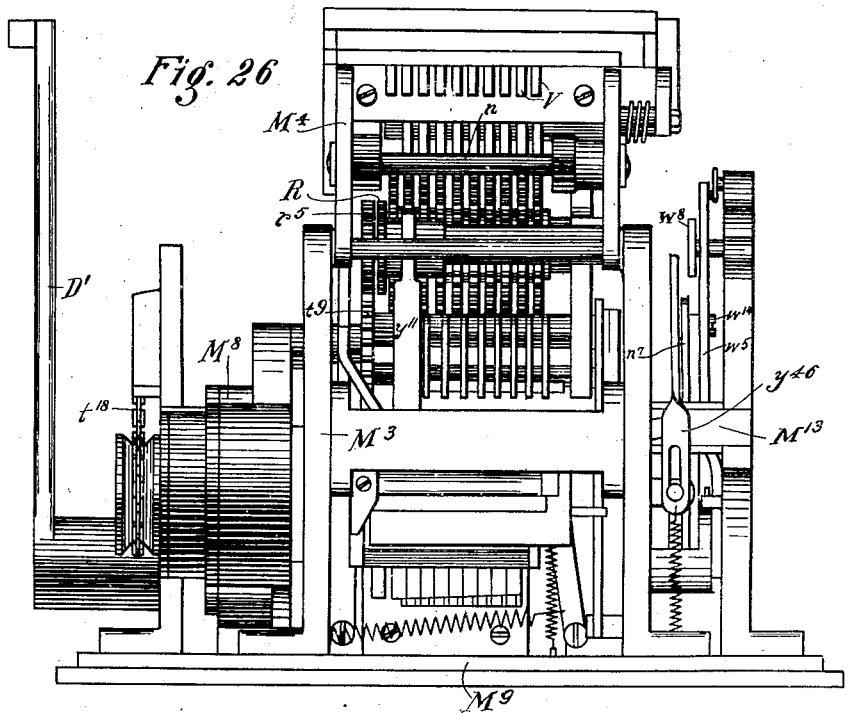
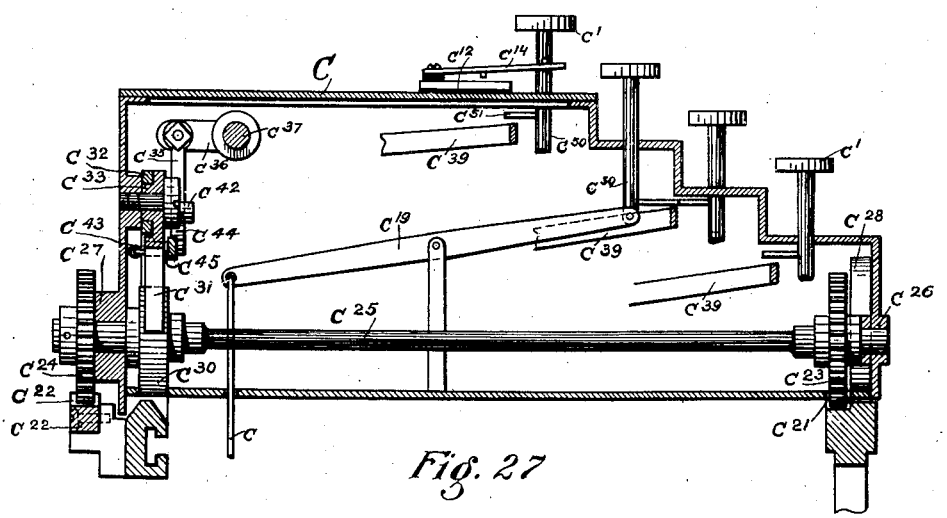

H. MARSHALL.
COMBINED TYPE WRITING AND COMPUTING MACHINE.
APPLICATION FILED APR. 8, 1902.

1,185,520.

Patented May 30, 1916.
11 SHEETS—SHEET 11.

WITNESSES:
Brennan B. West.
Nathan F. Fretter.

INVENTOR.
Holmes Marshall
BY Bates, Fouts & Hull,
ATTYS.

UNITED STATES PATENT OFFICE.

HOLMES MARSHALL, OF NEW YORK, N. Y., ASSIGNOR TO JOHN T. UNDERWOOD, OF BROOKLYN, NEW YORK.

COMBINED TYPE-WRITING AND COMPUTING MACHINE.

1,185,520.  Specification of Letters Patent. Patented May 30, 1916.

Application filed April 8, 1902. Serial No. 101,964.

*To all whom it may concern:*

Be it known that I, HOLMES MARSHALL, a citizen of the United States, residing at New York city, in the county of New York and State of New York, have invented a certain new and useful Improvement in Combined Type-Writing and Computing Machines, of which the following is a full, clear, and exact description, reference being had to the accompanying drawings.

The object of this invention is to provide a combined typewriting and computing machine in a form which shall require very little and very simple connecting mechanism in addition to usual typewriting and computing mechanism.

More specifically the object is to provide intermediate mechanism between a computing machine and a book type writer, wherein the type-writer proper travels both across the page and down it. Such a typewriter is exemplified by the well known Fisher book typewriter, illustrated in patents to Robert J. Fisher, Nos. 569,625, 569,626, 569,627, of October 20, 1896, and No. 573,868, of December 29, 1896. The computing mechanism I prefer to employ is of the type illustrated in Patent No. 683,939, granted October 8, 1901, to W. W. Hopkins. The connection which I make between the two machines is preferably electrical.

A characteristic of the book typewriter is that the whole machine travels down the page and the carriage with the key board and type travels across the page within the downwardly shiftable frame, wherefore the keys have no determined position. My intermediate connection is especially designed so that it shall in no way interfere with the travel of the typewriter, and shall not, itself, be disturbed thereby.

A characteristic of the Hopkins adding machine is that it has but two rows of keys, one row having as many keys as there are columns and the depression of any key operating to select the corresponding column, in which the number to be struck begins, and the other row having the whole gamut of digits being adapted to strike any digit in the column selected by the first mentioned row. Now the Fisher typewriter has a tabulating device (illustrated in Patent No. 666,762, of January 29, 1901, to Charles F. Laganke) arranged to stop the machine at various points according to the column in which the number to be written begins. This I connect with the column selecting row of keys in the computer so that the simple setting of the tabulator to stop the typewriter at the proper column automatically selects the proper column in the computing machine. The numeral keys of the typewriter are individually connected with the keys in the digit row of the computing machine. From these two methods of connection there results an automatic computation of the numbers struck on the typewriter.

The invention comprises broadly the combination of a traveling typewriter flexibly connected with a computing machine; the connection of the tabulator of a typewriter with the column selecting rows of keys of a computer; and the means, more or less particularly, as hereinafter described and claimed, for embodying these features in a simple and efficient working mechanism.

Figure 2:
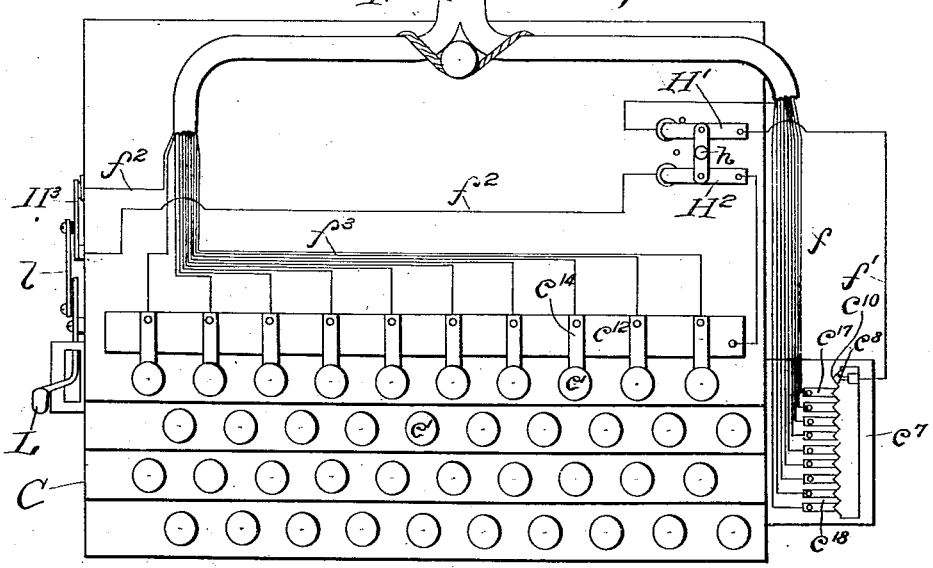
Figure 3:
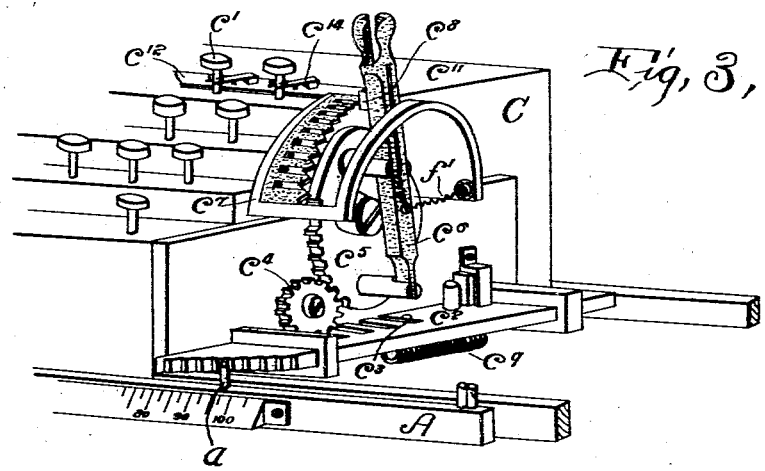
Figure 4:
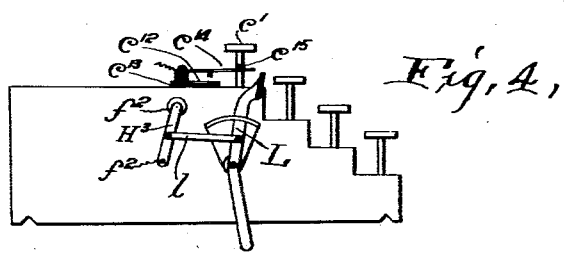
Figure 5:
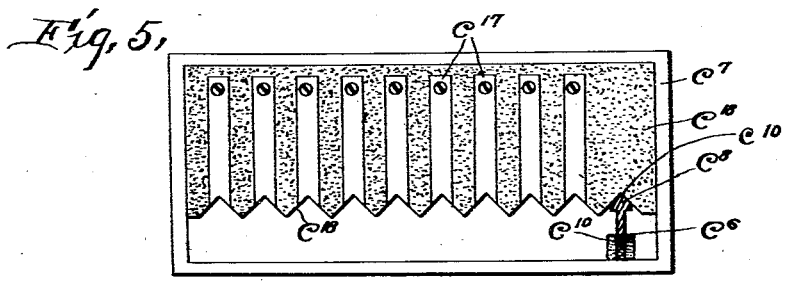
Figure 6:
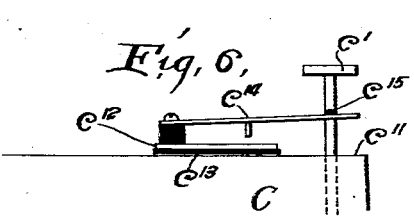
Figure 7:
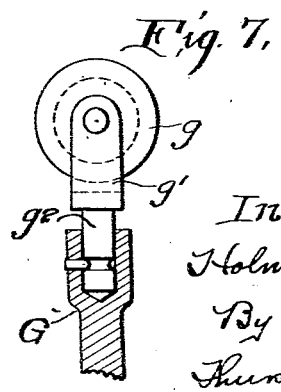
Figure 8:
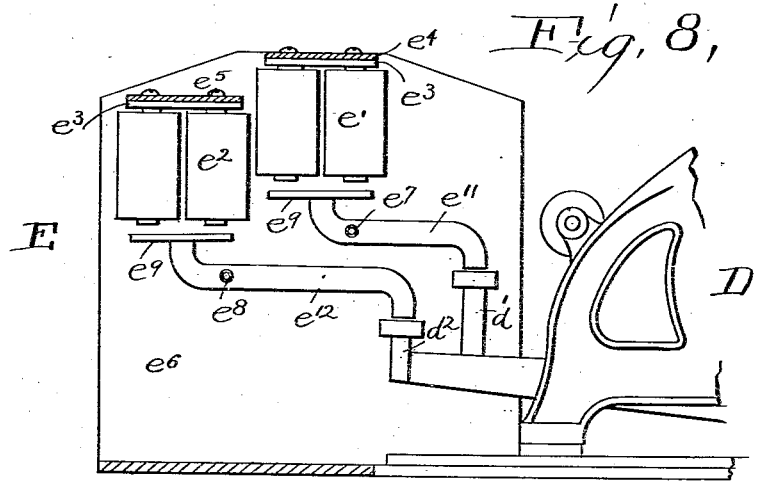
Figure 9:
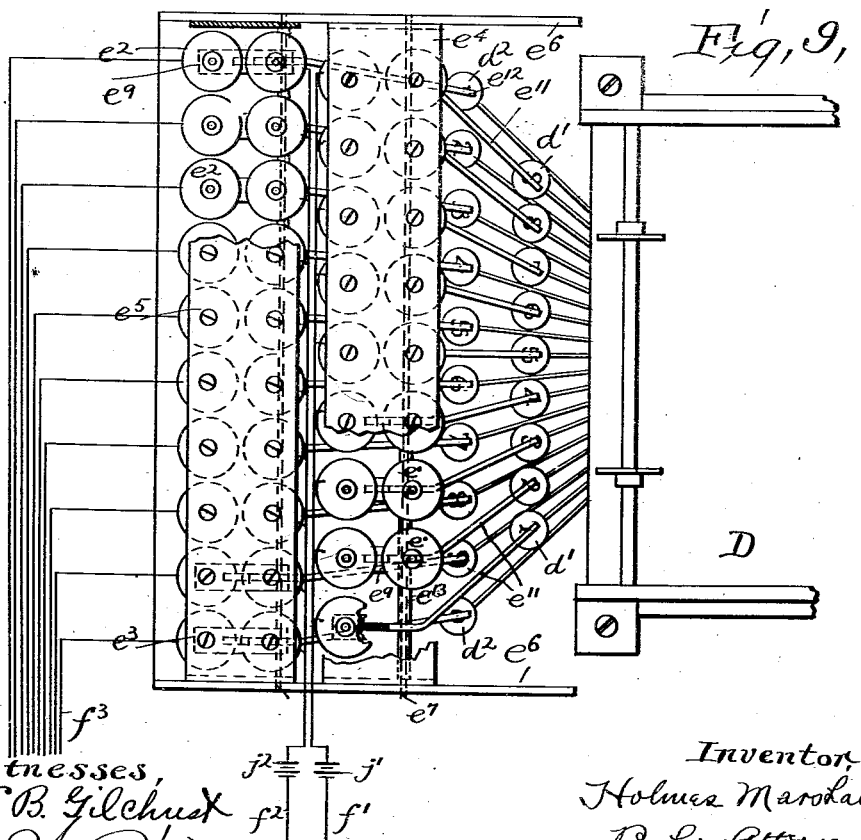
Figure 10:
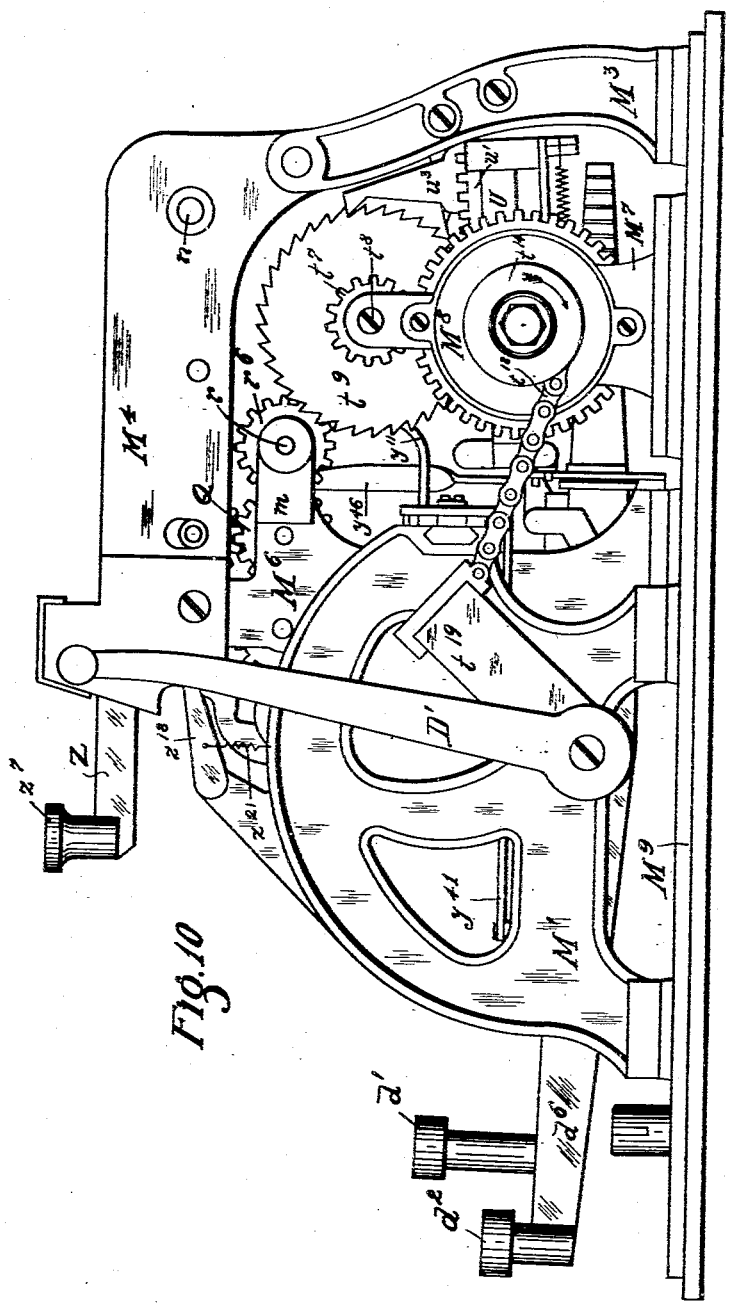
Figure 11:
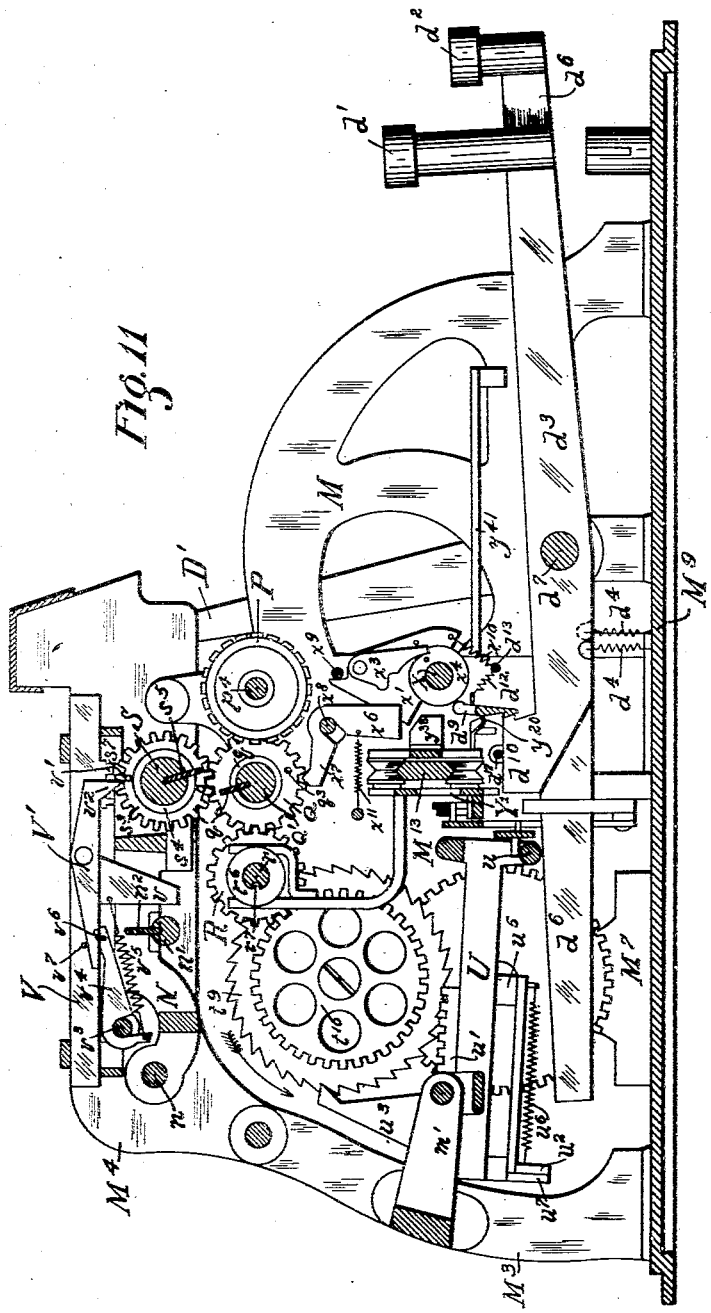
Figure 12:
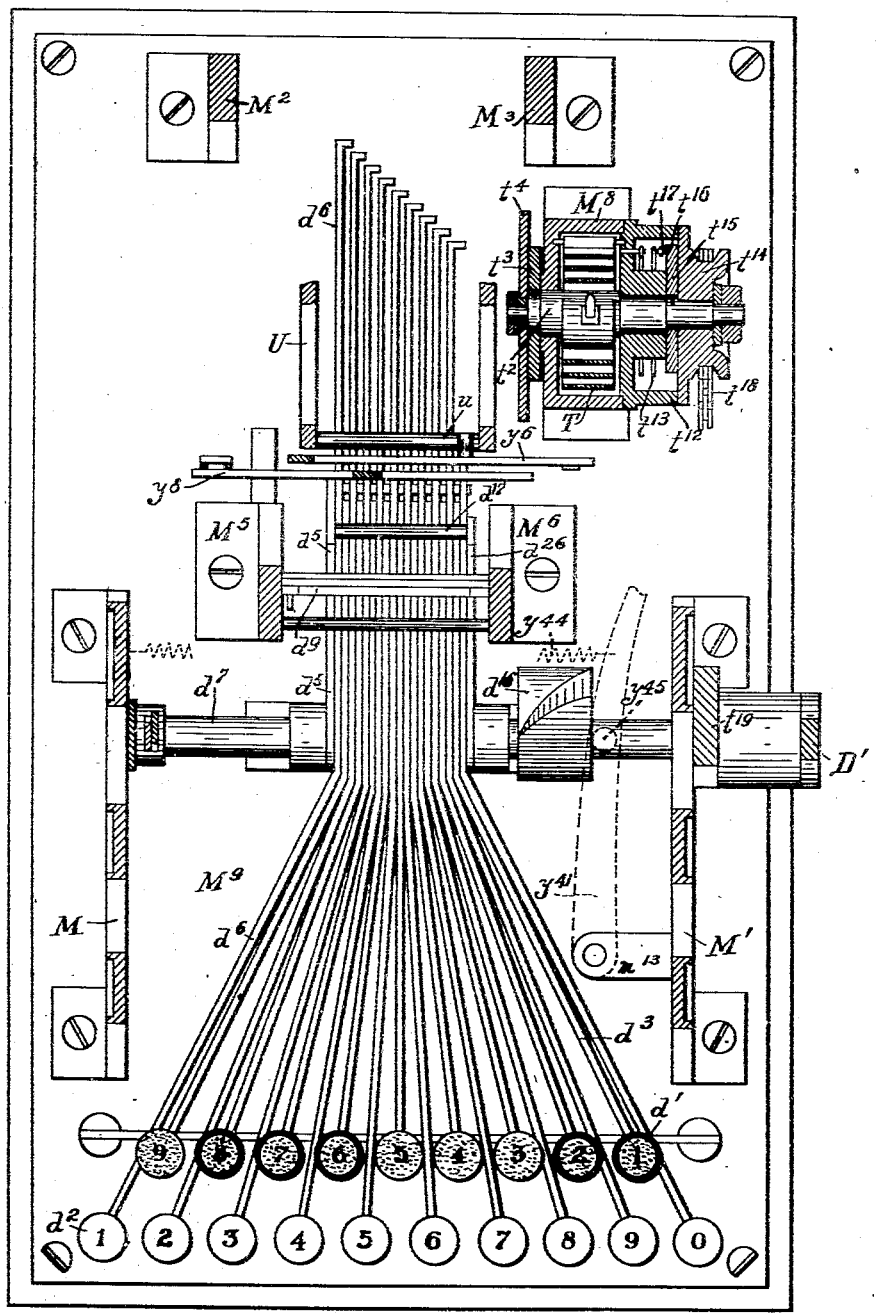
Figure 20:
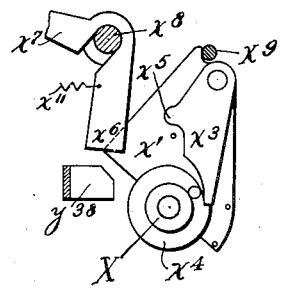
Figure 21:
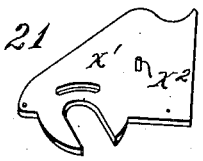
Figure 23:
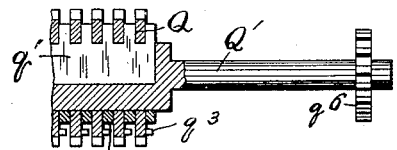
Figure 22:
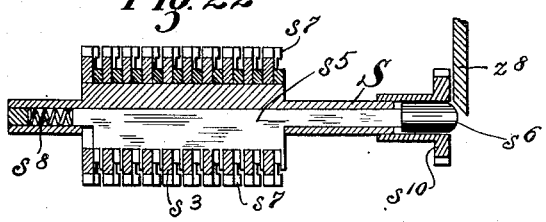
Figure 24:
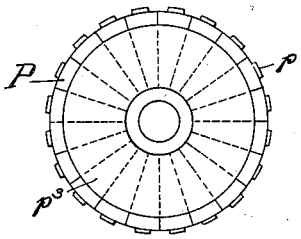
Figure 28:
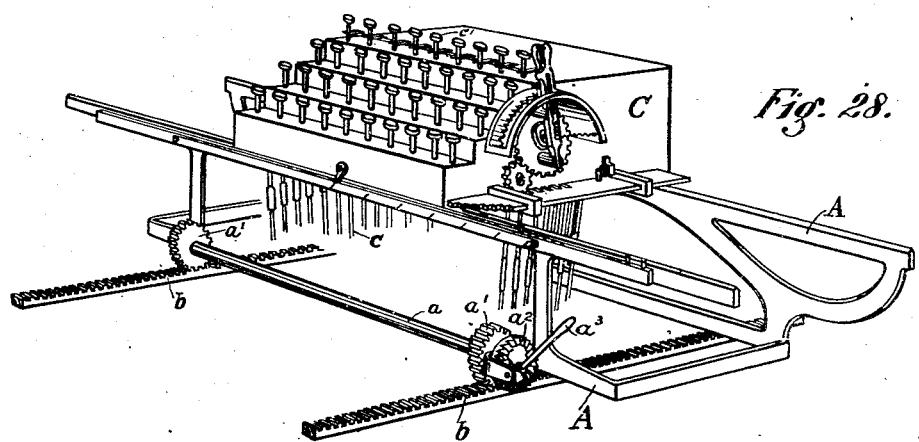
Figure 29:
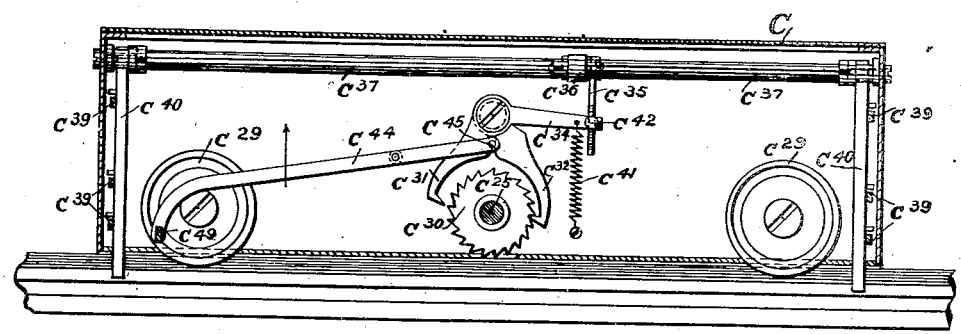
Figure 30:
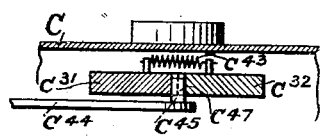

*Drawings.*—In the drawings, Figure 1 is a perspective rear view of the typewriter of the Fisher type, a computing machine of the Hopkins type, and my intermediate connection between them; Fig. 2 is a plan of the typewriter carriage, showing diagrammatically the arrangement of the electric circuits thereat; Fig. 3 is a perspective view of the right-hand end of the carriage; Fig. 4 is a side elevation of the left-hand end of the carriage; Fig. 5 is a development of the tabulator gage, shown in Fig. 3; Fig. 6 is a side elevation of the circuit closers mounted on the carriage; Fig. 7 is a vertical section through the swivel supporting the connecting cable from the typewriter; Fig. 8 is a sectional side elevation of the actuator for operating the computer; Fig. 9 is a plan of the same, showing also the electric circuits, except the individual wires for the forward row of magnets, which are omitted for clearness; Fig. 10 is a side elevation of the computing mechanism partially shown in Figs. 1, 8 and 9; Fig. 11 is a sectional side elevation of such computing mechanism from the opposite side; Fig. 12 is a horizontal sectional view of the computing mechanism; Fig. 13 is an elevation of a portion of the computing mechanism showing part of the frame and the members actuated by the movement of the total key; Figs. 14 to 25 inclusive, are details of the computing mechanism as follows; Figs. 14 and 15 showing more fully certain parts bearing in Fig. 13; Fig. 16 showing a portion of the order and registering key bars; Fig. 17 showing the key lever catch plate; Fig. 18 showing the carriage; Fig. 19 being a rear view of the carriage and a portion of the frame and showing some of the devices used to actuate the carriage; Figs. 20 and 21 being a side elevation and a perspective of one of the order stop pawls; Fig. 22 being a section through the adding wheels and the total shaft; Fig. 23 being a longitudinal section showing a portion of the idle wheels; Fig. 24 being an end view of one of the indicator wheels; and Fig. 25 a section of such wheel. Fig. 26 is a rear elevation of the computing mechanism. Fig. 27 is a vertical cross section of the typewriter carriage shown in Figs. 1, 3 and 4. Fig. 28 is a perspective view of the typewriter carriage, the racks and the intermediate frame, showing mechanism for moving the frame and carriage down the page. Fig. 29 is a longitudinal section of the carriage showing the escapement. Fig. 30 is a cross section through the escapement dogs.

*General arrangement.*—In the drawings, A is the traveling frame of a book typewriter, supported on the table B and carrying the traveling carriage C in the usual manner.

D represents the computing mechanism which may be located at any convenient point.

E is the actuator for operating the computer; F the cable connecting such mechanism with the typewriter carriage; G a specially formed support for such cable; and K a take-up weight on the cable.

J represents a suitable battery.

*Typewriter-feeding mechanism for frame and carriage.*—As shown in Fisher Patent No. 573,868, referred to, there are a pair of racks $b$ carried by the table B, and adapted to be placed over the page or paper and hold it in position. To feed the traveling frame down the page there is provided a shaft $a$ carried by the frame and having pinions $a'$ in engagement with the racks $b$. On one end of the shaft is a crown ratchet wheel $a^2$ adapted to be operated by a pawl actuated by a hand lever $a^3$. This enables the intermediate frame A and carriage C to be fed down the page to provide for the line spacing.

The typewriter carriage C carries on its under side the type, which are adapted to act on the book or paper, and on its upper side the finger keys $c'$. These finger keys are operatively connected with the type, the mechanism shown being by levers $c^{19}$ connected at one end of the stems $c^{50}$ of the keys and at the other end with links $c$ leading to the type bars. Formed in or let into the front carriage-guide is a front rack $c^{21}$, and arranged contiguous to the rear guide is a similar rack $c^{22}$, which are respectively engaged by front and rear carriage-feeding pinions $c^{23}$, and $c^{24}$, secured to a common transverse spindle $c^{25}$, mounted in front and rear bearings $c^{26}$ and $c^{27}$ in the carriage. The carriage is also provided with bearing-rollers $c^{28}$ and $c^{29}$ to relieve said pinions of the weight of the carriage. The carriage feeding mechanism further includes a ratchet wheel $c^{30}$, fixed to the shaft $c^{25}$, and operating and holding dogs $c^{31}$ and $c^{32}$. The operating dog is provided with a reduced hub or sleeve $c^{33}$, upon which the holding dog is mounted, and an operating arm $c^{34}$, rigid with the operating dog, is connected by means of a link $c^{35}$ with a crank arm $c^{36}$ on the rock shaft $c^{37}$. This rock shaft is mounted longitudinally in the carriage to receive motion from the keys $c'$ by means of projecting studs $c^{51}$ and yokes $c^{39}$ and slides $c^{40}$, as shown and described in other Fisher patents mentioned, whereby at each depression of a key the rock shaft is operated to elevate the arm $c^{34}$ and throw the detent of the operating dog $c^{31}$ into engagement with the teeth of the feeding ratchet $c^{30}$, the detent of the holding dog $c^{32}$ being simultaneously disengaged from the teeth of the feeding ratchet. The operating dog is normally held out of engagement with the feeding ratchet by means of a spring $c^{41}$, which holds the operating arm depressed. A swivel $c^{42}$ forms the connection between the link $c^{35}$ and the arm $c^{34}$ said link being threaded in the swivel, whereby adjustment between the link and the operating arm is possible after detaching the upper end of said link from the arm $c^{36}$, in order to bring the operating and holding dogs into the proper relative position with relation to the ratchet wheel.

As above described, the holding dog is mounted upon the hub or sleeve $c^{33}$ of the operating dog and receives motion simultaneously with the operating dog from the arm $c^{34}$, said holding dog being normally held in a given position (shown in Fig. 29,) with relation to the operating dog by means of a spring $c^{43}$, (shown in Fig. 30), and in order to provide for disengaging the holding dog from the ratchet wheel to allow movement in either direction of the carriage independently of the feeding mechanism there is employed a trip-lever $c^{44}$, provided at one extremity with a trip-pin $c^{45}$, which is arranged in engagement with a downwardly tapering or V-shaped notch $c^{46}$, formed in the meeting edges of the operating and holding dogs. (Shown clearly in Fig. 30.) The portion of said notch which is formed in the holding dog constitutes a cam face $c^{47}$, and when the trip arm is operated in the direction indicated by the arrow in Fig. 29, the trip pin descends upon said cam face and swings the holding dog outwardly or from the ratchet wheel against the tension of the spring $c^{43}$. Any suitable means may be employed for operating the trip lever, such as a release key operating a lever $c^{49}$.

*Typewriter tabulator.*—The upper row of keys are the numeral finger keys from zero to 9 inclusive. On the right hand end of the typewriter carriage is a tabulator consisting essentially of a stepped plate $c^2$, which may be shifted forward or backward by means of the rack teeth $c^3$, the pinion $c^4$, the gear $c^5$, and the lever $c^6$ for operating the same. The position of the stepped bar $c^2$ is determined by the notch in the guard plate $c^7$ which the spring detent $c^8$ on the lever $c^6$ engages. If this detent $c^8$ is in the first notch $c^{10}$ (which is a preliminary notch) in the guard $c^7$, the bar $c^2$ will entirely miss the pins $a$ on the frame A, and the carriage will be allowed to travel to the extreme right of its movement. If, however, the lever $c^6$ is moved so that the detent engages the second notch, which is the first effective notch, the rotation of the gear $c^5$ through the pinion $c^4$ shifts the bar $c^2$ forward sufficiently to cause the first step to engage the next pin $a$ and stop the carriage at the farthest right hand column which is to be written, that is the units column. If the detent engages the third notch the carriage is stopped one further space to the left which is for the tens column, and so on. Thus the different notches in the guard plate $c^7$ correspond to the column which the first numeral of a digit to be struck occupies. This is further explained in the patent to Laganke referred to, where the setting of the tabulator releases the carriage, the releasing connection being omitted herein for simplicity.

To illustrate the operation of the tabulator, if, of the various numbers to be written in column, the first number is 6 the detent $c^8$ will be set to engage the first notch. If the second number is 628 the detent will engage the third notch. If the third number is 27 the detent will engage the second notch. If the fourth number is 100,000,000 the detent will engage the 9th notch, or, in this case, the last one. Thus in the operation of the typewriter if the member $c^6$ is set for each line according to the column in which the number begins the various numbers will be placed in a perfect column. After the steps on the bar $c^2$ have engaged the pin $a$ the detent $c^8$ is released and thereby the spring $c^9$ on the under side of the bar $c^2$ immediately draws the same rearward out of the way, allowing the carriage to proceed. I have not shown any key for releasing the member $c^6$, as none is necessary, since simply moving the arm of the detent $c^8$ slightly to the right against its light spring $c^{20}$ (Fig. 5) is sufficient; though, in practice, for convenience, a special key may be provided for this, or the pin $a$ may be provided with means for depressing it to allow the stepped bar to pass over it.

*General characteristics of computer.*— D represents a computing machine of the Hopkins type, as stated as hereinafter more fully described. This machine has a row of keys $d'$ for selecting the proper column to be acted upon. Nine columns is a convenient range, and such is the range shown herein, the nine keys appearing in figure 9, the units key being number 1; the tens key 2, and so on, the 100,000,000 key being number 9. The digit row of keys is designated $d^2$. In this row there are 10 keys containing all the digits from 1 to 9 and the zero. The computing mechanism is so arranged that when a selective key is struck the column in which the number begins is selected, and then the several computing or digit keys corresponding to the digits of that number may be struck in succession until the number is complete, the recording being accomplished through mechanism actuated by these keys. By way of illustration, if the number to be struck on the computer were 6 the number 1 key in the selective row $d'$ would be struck and the number 6 key in the digit row $d^2$. If the second number to be struck were 628 the number 3 key on the selective row would be struck and then successively on the digit row the keys 6, 2 and 8. This number would be printed by the machine and would be added on, in the sum-indicating mechanism, to the 6 previously struck. If the third number were 27 the number 2 key in the selective row would be depressed and then in the digit row the number 2 key and the number 7 key successively,—the 27 being printed by the computer and added on to the previous sum. If the fourth number were 100,000,000 the number 9 key would be depressed in the selective row and in the computing row the number 1 key first and then the zero key 8 times. Thus the key depressed in the selective row is simply the key corresponding to the position at which the number begins, or, stated in other words, the number of digits in the number to be written; then the different digits of the number are written on the digit row successively. This method of operation is a characteristic of several machines on the market, and is illustrated by the Hopkins machine as shown in his patent referred to and as hereinafter more fully described.

The actuator E which I provided for operating the keys of the computer consists of two series of magnets $e'$ and $e^2$, the series $e'$ corresponding to the column-selecting row of keys and the series $e^2$ corresponding to the digit row, and there being one magnet for each key. Each magnet consists preferably of two coils with a back armature $e^3$, and the two series are supported respectively by the brass cross plates $e^4$, $e^5$ to which the magnet coils are screwed or bolted, and which are held by suitable frame side plates $e^6$. Journaled on rods $e^7$ and $e^8$, extending from one side plate to the other, are levers $e^{11}$ and $e^{12}$ separated from each other by sleeves $e^{13}$. These levers carry at their upper ends armature plates $e^9$ for the magnets to operate upon, and at their lower ends are adapted to engage the finger keys in the rows $d'$ and $d^2$ respectively. Thus if one of the magnets $e'$ is energized it depresses the corresponding key in the selective row $d'$, and if one of the magnets $e^2$ is energized it depresses the corresponding key in the digit row $d^2$.

*Connections between typewriter and actuator.*—Now the guard plate $c^7$ on the tabulator of the typewriter is divided into metallic strips $c^{17}$ insulated from each other by hard rubber $c^{18}$, for example,—there being one strip terminating at the base of each of the ten notches shown with the exception of the first or preliminary notch. From these nine strips $c^{17}$ nine wires $f$ lead, through the cable, F, to one side of the different magnets $e'$ successively (omitted in Fig. 9); and from the detent $c^8$, (or some part connected with it) a tenth wire $f'$ leads, through a battery $j'$, to the other side of all of the magnets $e'$. Fig. 3 shows the member $c^6$ made of insulating material to properly insulate the detent $c^8$.

If the detent $c^8$ is in the first or preliminary notch in the guard plate no circuit to the computer is connected. If, however, the detent is in the first effective notch, which is the second notch shown, the first magnet $e'$ is connected in circuit with the battery and energized, which depresses the selective key $l$ in the row $d'$. If the detent is in the third effective notch the third magnet is energized and the number 3 key in the selective row is depressed, and so on. So the simple setting of the tabulator at once selects the proper column both for the typewriter and the computer.

Mounted on the top plate $c^{11}$ of the typewriter carriage C is a strip of metal $c^{12}$ insulated from the carriage by the strip of insulation $c^{13}$. The plate $c^{12}$ carries, insulated from it, ten contact strips $c^{14}$, each of which extends beneath a pin $c^{15}$ on the shanks of the numeral keys $c'$. Ten wires $f^3$ lead from the ten strips $c^{14}$ through the cable F to one side of the magnets $e^2$ severally, as shown in Fig. 9. A wire $f^2$ leads from the plate $c^{12}$ through a battery $j^2$ jointly to the other side of all of the magnets in the series $e^2$. From this connection it results that whenever a numeral key $c'$ in the typewriter is depressed a circuit is closed through the corresponding magnet $e^2$, which being energized depresses the corresponding key in the digit row $d^2$ of the computer.

I provide suitable switches H' and H² in the common return lines $f'$ $f^2$ of the two systems of circuits so that the actuator may be thrown out of operation whenever desired. If the typewriter employs a shift, using numeral keys to print other characters also, I provide a switch for the computing circuit which is automatically thrown open by this shift. This is illustrated in Figs. 2 and 4, as an additional switch H³, in the line $f^2$, and connected by a link $l$ with the shift key L of the typewriter. When the top row of keys $c'$ are acting to print numerals on the typewriter, the switch H³ is closed; when these keys print other than numerals, the switch H³ is open.

The eleven wires $f^2$ $f^3$ of the computing circuit and the wires of the selecting circuit (of which, in the machine shown, there are 10, $f$ and $f'$) are all collected together into the cable F. This cable runs from the computer carriage over a pulley $g$ and depends in a bight where it carries a take-up weight K. The pulley $g$ is journaled in a yoke $g'$ which has a cylindrical shank $g^2$ taking into a tubular opening in the standard G rising from the typewriter table. The pulley $g$ is thus swiveled so that the cable F may easily run onto it from any direction and allow the typewriter carriage to move perfectly freely. At the rear of the pulley $g$ the cable is secured to some stationary support, as the arm $g^3$ of the standard G, and from there it runs to the computer actuating mechanism E, the two common return strands $f$ $f^2$ intermediately passing through the two batteries $j'$ $j^2$ in the box J.

It will be seen that my connection in no way interferes with the operation of the typewriter when it is connected. Its operation may be discontinued by simply throwing the switches H' and H², which may have a common operating handle $h$. The computer D may be withdrawn from the actuator E whenever desired, as it is not necessary to have any positive connection between them, and thus the computer may be used as a hand machine totally independent of the typewriter, without disturbing any of the connections. The installation or removal of the connecting mechanism may be very easily accomplished; it is inexpensive to construct, effective in operation, and durable in service.

*Computer—General description of mechanism.*—I will now describe the computing mechanism proper, referring more particularly to Figs. 9 to 25. When one of the selective or order keys $d'$ is depressed, a carrier is moved into position to actuate the registering wheel of the corresponding order. When the digit or registering keys $d^2$ are depressed, they unlock a motor and so govern an escapement mechanism that the motor is permitted to rotate the registering wheel exactly proportional to the keys depressed. At the front of the machine is a series of indicating wheels which are adapted to indicate the amounts added. In the Hopkins patent referred to these indicating wheels are shown as affecting their indication by printing on a strip of paper. For simplicity however, the paper and printing hammer are omitted herein, and the wheels form simply visual indications, which simplification is suggested in the Hopkins patent.

The indicator wheels are loosely mounted or journaled on a shaft which is preferably horizontal,—the number of the wheels determines the full capacity of the machine and is preferably one greater than the number of selective keys. At the rear of the adding wheels are a set of idle wheels corresponding in number to the indicating wheels and are also loosely journaled on the shaft which is parallel to the shaft on which the indicating wheels are journaled. Above the idle wheels are loosely journaled upon a shaft a corresponding number of adding wheels. These latter mentioned wheels work in conjunction with a carrying mechanism and are adapted to be swung either into engagement with the idle wheels or with the carrying mechanism. To the rear of the idle wheel is a shaft upon which is mounted a spur wheel which is adapted to engage successively with the various idle wheels. This spur wheel is so mounted upon the shaft as to move longitudinally of it, but to be incapable of independent rotation. The axial movement of this spur-wheel is governed by the carriage, which is controlled by the above-mentioned order and registering keys. The shaft upon which the said spur wheel is mounted has rigidly secured to its end a second spur wheel, which is rotated by a motor whose movement is controlled by the registering keys. It will be seen from this that when one of the order keys is depressed and the carriage brought into the desired order the laterally moving spur wheel will be brought in the same order and will actuate the idle wheel in that order, and thereby both the indicating and adding wheels of said order, as the adding wheels are normally in engagement with the idle wheels. As the registering keys are depressed the carriage will move successively from order to order, thus bringing the spur wheel successively in engagement with the idle wheels.

As the adding wheels in the different orders are rotated, they position the carrying mechanism for carrying in the various orders, as required. When the handle is pulled, it brings the indicator wheels to zero and at the same time returns the carriage to its normal position and also actuates the carrying mechanism to carry in any of the orders in which it may have been positioned for carrying by the adding wheels, the adding wheels being thrown out of engagement with the idle wheels and into engagement with the carrying mechanism during the first part of the motion of the handle.

When it is desired to take the sum of the numbers registered, a key, which I term the "total key," is depressed to transfer the sum from the adding wheels to the indicating wheels. As this movement of the adding wheels is in the opposite direction to their normal movement, it will be readily seen that the sum upon the adding wheels will be transferred to the indicator wheels, as the said wheels have the characters repeated upon them in ascending order from each side of the zero.

I will now describe the various parts of the compositor, as shown, after which I will explain the specific operation thereof.

*Computer frame.*—Near the forward end of the computer are two side frames $M$, $M'$, and at the rear are two standards $M^2$ and $M^3$ to which is attached one end of the frame $M^4$, the other end of which is attached to two uprights $M^5$ and $M^6$. $M^7$ is a standard to which is attached the motor casing $M^8$. The side frames $M$ and $M'$ and the standards referred to are secured to a base $M^9$. Swung within the frame $M^4$ is a frame $N$.

Figure 25:
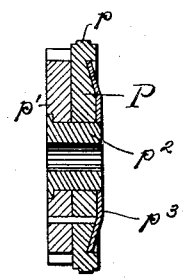

*Indicating and idle wheels.*—The indicating wheels are preferably one more in number than the order keys of the machine, so as to allow the indication of a sum which has one more order than any number which can be registered in the machine; but they may be any greater number. The indicating wheels P are composed of a spur wheel $p'$ and an attached disk with indicating numbers on its periphery, as shown in Fig. 25. This indicating disk may be composed of a number of sectors each of which carries one character $p$. The separate parts of the wheel P are held in place by means of a hub $p^2$, and washer $p^3$. The indicating wheels P are loosely journaled on a shaft $p^4$. The characters of the wheel P are arranged in regular order from "1" to "9" inclusive at each side of the "0". The "0" normally stands at the front of the wheel in the indicating position. Meshing with the spur wheels $p'$ are a series of idle wheels Q, (Fig. 11) which are loosely mounted on a shaft $Q'$. Between each of the two wheels Q is a split washer $q$. Secured in the shaft $Q'$ is a comb $q'$, the teeth of which project between the spur wheels Q and are adapted to come in contact with pins $q^3$ which project from the left side of each of the spur wheels Q. When the shaft $Q'$ is rotated the proper distance, the comb $q'$ brings the wheels Q into their normal position, thus positioning the indicating wheels P with which the said idle wheels Q are in engagement. The shafts $p^4$ and Q' are journaled in the uprights $M^5$ and $M^6$ referred to. At the rear of the shaft Q' is a shaft $r$ which is journaled in rearwardly extending arms $m$ carried by the uprights $M^5$ and $M^6$. Rigidly secured to the shaft $r$ is a spur wheel which is adapted to be actuated by the motor, to be hereinafter described. Mounted on the shaft $r$ is a collar $r^6$ which is provided with a spline or feather $r^7$ which runs in a groove $r^8$ on the shaft $r$. This allows the collar $r^6$ to move freely in the direction of the shaft $r$, but prevents rotation independent of said shaft. Secured to the collar $r^6$ is a spur wheel R which is the master or actuating wheel and is adapted to mesh successively with the idle wheels Q, as it is moved along the shaft $r$ by the carrier, which is to be hereinafter described. This master wheel is normally out of mesh with any of the idle wheels, and stands at the extreme right thereof, as shown in Fig. 26.

*Adding wheels.*—Journaled in the frame N is a shaft S, upon which are mounted a number of spur wheels $s^3$ which correspond in number to the idle wheels Q and normally engage therewith. Between each two wheels $s^3$ and around the shaft S is a split washer $s^4$. Carried in the shaft S is a movable comb $s^5$ which is actuated by pressure upon the end of an extension $s^6$. Upon each of the wheels $s^3$ and at diametrically opposite points are teeth $s^7$ which are cut away at their inner ends so that the comb $s^5$ does not materially strike them,—this comb being kept normally in a right hand position by a spring $s^8$.

*Motor and gearing.*—T, (Fig. 12), is the motor spring, one end of which is attached to the motor casing $M^8$ and the other to the motor shaft $t^2$. Rigidly secured to the motor shaft is a ratchet wheel $t^3$. Loosely mounted on the motor shaft is a spur wheel $t^4$ on which is carried a spring-pressed pawl (not shown) which engages the ratchet wheel $t^3$. The spur wheel $t^4$ meshes with the spur wheel $t^7$ (Fig. 10), on a stud $t^8$. The spur wheel $t^7$ is rigidly connected to a ratchet wheel $t^9$ which in turn is rigidly connected with a spur wheel $t^{10}$. This spur wheel $t^{10}$ meshes with the wheel $r^5$ which is rigidly secured on the shaft $r$. In the cover $t^{12}$ of the motor casing $M^8$ is a coil spring $t^{13}$, one end of which is attached to the cover $t^{12}$ and the other end to a pin $t^{17}$ carried by a pulley $t^{14}$ which is loosely journaled on the motor shaft $t^2$. Rigidly secured to the motor shaft $t^2$ is a disk $t^{15}$, which is provided with a projection $t^{16}$ which is adapted to strike against the pin $t^{17}$. Secured to the pulley $t^{14}$ and passing around the same is one end of a chain $t^{18}$, the other end of which is secured to an arm $t^{19}$, which is actuated by a handle D'.

*Registering keys and mechanism for controlling motor escapement.*—The registering or digit keys indicated by $d^2$ are numbered 1 to 9 inclusive, beginning at the left. The "0" registering key, for convenience, is placed at the right. $d^6$ represents the registering key bars which are pivoted on a shaft $d^7$. The registering key bars vary in length, as shown in Fig. 12. Secured to the rear uprights $M^2$ and $M^3$ are arms $m'$ to which is pivoted a frame U. Secured in the frame U is a rod $u$ which passes over and rests upon all the registering key bars except the "0" key bar. Sliding in the frame U is a rack $u'$ by which is carried a stop $u^2$ which is adapted to come into contact with the ends of the bars $d^6$. Carried on the frame U is a dog $u^3$ which engages with the ratchet wheel $t^5$ and prevents the ratchet wheel and thereby the motor from rotating. The bars $d^6$ are held in their normal position by springs $d^4$. Carried by the rack $u'$ is a downward extension $u^5$ to which is attached one end of a spring $u^6$, the other end of which is attached to a downward extension $u^7$ of the frame U. The object of this spring is to return the rack $u'$ to its normal position after it has become disengaged from the spur wheel $t^{10}$.

*Carrying mechanism.*—Secured in the frame $M^4$ are a number of carrying bars corresponding in number to the adding wheels $s^3$ in the machine, each of these bars except that at the right hand is adapted to slide longitudinally a slight distance. Extending downward from each of the bars V, except from that at the right hand, is an arm $v$, and each of the bars is provided with teeth $v'$, preferably three in number, which are adapted to be engaged by the adding wheels when those wheels are raised. Pivoted to each of the bars V at its right hand side is a pawl V' having a downward projection $v^2$ at its forward end. Pivoted on the shaft $v^3$ in the frame $M^4$ are pawls $v^4$ corresponding in number to the bars V and engaging with them. Between each of the pawls $v^4$ and the arm $v$ of the corresponding carrying bar is a stretched coil spring $v^5$. In each of the pawls $v^4$ is a pin $v^6$ upon which rests the end of the pawl V' which is pivoted to the next carrying bar to the right, and in each of the carrying bars is a pin $v^7$ which limits the upward movement of the pawl V' which is pivoted to it.

*Means for raising the adding wheels, to put them in engagement with the carrying bars.*—The frame N, in which the shaft S of the adding wheels $s^3$ is journaled, is pivoted on the frame $M^4$ at the point $n$. Below the frame N and journaled on the frame $m^4$ is a shaft $n'$ which is provided with a plate $n^2$ which is adapted to come in contact with the arms $v$ of the carrying bars V and thus move the carrying bars to their normal position. The shaft $n'$ is flattened on its upper side, beneath the frame N, so that when the shaft is rotated, the frame N will be swung upward on its pivot.

*Carriage and actuating mechanism.*—In the rear of the frames M M' is secured a guide $M^{13}$ (Figs. 11, 18 and 19), upon which the carriage runs. The carriage is composed of a front plate Y and a rear plate Y', between which are secured grooved wheels $y$ which run upon the guide. At the rear of the plate Y' is secured a ratchet bar $y'$. At the right hand end of the ratchet bar $y'$ is a pin $y^2$. Depending from the plate Y' is a stop $y^3$ having a lateral projection $y^4$. The stop $y^3$ is adapted to come in contact with the order key bars hereafter to be described. Pivoted to the guide $M^{13}$ is a dog $y^5$ which engages with the ratchet bar $y'$. Pivoted to the lower and rear part of the upright $M^5$ is a T-shaped lever $y^6$, to which is pivoted a dog $y^7$, which also engages with the rack bar $y'$. Pivoted to the lower end of the upright $M^6$ is an L-shaped lever $y^8$ which carries a pin $y^9$ extending under the dogs $y^5$ and $y^7$ and adapted to raise such dogs. Carried by the T-shaped lever $y^6$ is a stop $y^{10}$ which is adapted to come in contact with the pin $y^2$ carried by the rack bar $y'$ and thus lock the lever $y^6$ against movement when the carriage is in its normal position. Extending upwardly from the rear plate Y' is an arm $y^{11}$, having at its upper end a U-shaped portion $y^{12}$ which takes into a groove upon the collar $r^6$ and thus moves the collar and the attached master wheel R longitudinally upon the shaft $r$.

The order keys designated $d'$ are numbered, as shown, from "1" to "9" inclusive from right to left. $d^3$ are the order key bars which pass between the registering key bars and are pivoted on the same shaft $d^7$. Pivoted on this shaft at the sides of the registering and order key bars are arms $d^5$ and $d^{26}$. Carried by these arms is a rod $d^{17}$ which is adapted to be raised by the order key bars when the order keys are struck. An extension of the arm $d^5$ engages with the L-shaped lever $y^8$ and this raises the dogs $y^5$ and $y^7$. Extending rearwardly from the lever $y^6$ is a pin or projection $y^{18}$ which rests upon the rod $u$ of the frame U. Pivoted in the uprights $M^5$ and $M^6$ above the order key-bars $d^3$ is a catch $d^9$ (shown detached in Fig. 17), which is adapted to come into engagement with offsets in the edge of the upward extensions $d^{10}$ of the order key bars $d^3$.

Secured to the front plate Y of the carriage is a projecting plate $y^{20}$ provided with a downwardly extending pin $y^{21}$ which is adapted to come in contact with the upper extension of the order key bars $d^3$. The catch $d^9$ is held in its normal position by a spring $d^{12}$ which is secured to the catch and to the rod $d^{13}$ extending between the uprights $M^5$ and $M^6$. Secured to the arm of the T-shaped lever $y^6$ is a spring $y^{24}$, the other end of which is secured to the base plate near the right hand side of the machine. The object of this spring $y^{24}$ is to move the lever $y^6$ to its normal position after it has been swung on its pivot by the movement of the bars $d^0$, and thus feed the carriage one space toward the right.

*Mechanism for bringing the indicating wheels to zero.*—On the left hand end of the idle wheel shaft Q' is a spur whele $q^6$ Pivoted to the frame M is an arm W carrying the toothed segment $w^4$ which engages with the spur wheel $q^6$. An arm $w^5$ rides over the shaft $d^7$ so as to allow both an upward and downward and lateral movement. In the upper end of the arm $w^5$ is an opening $w^6$ through which extends a pivot $w^7$ of the arm W,—this pivot being provided with a head $w^8$ which prevents the arm being displaced. To the right of the pivot $w^7$ is a pin $w^{10}$ secured in the arm W. This pin is normally in engagement with a notch $w^{11}$ in the upper end of the arm $w^5$. Secured to the shaft $d^7$ is an arm $w^{12}$ to which is pivoted one end of the link $w^{13}$,—the other end of which is attached to the arm $w^5$ by a screw $w^{14}$ which passes through a slot $w^{15}$ in the arm. At the front of the pivot $w^7$ is secured in the arm W a pin $w^{16}$ adapted to be brought into engagement with a recess $w^{17}$, in the upper part of the arm $w^5$ when this arm is moved forward. The arm $w^5$ is held in its normal position by a spring $w^{18}$, one end of which is attached to the upper end of the arm and the other end (not shown) to the frame M.

*Means for taking the total.*—Carried by the uprights $M^5$ $M^6$ is a shaft on which are pivoted a number of pawls which I term order stop pawls, corresponding in number to the number of indicating wheels. To each of the order stop pawls $x'$ is pivoted a dog $x^3$ which prevents the rotation of the pawls $x'$ in the forward direction by contact with a notch in a flange $x^4$ on the shaft X. Each of the dogs $x^3$ is provided with a rearward extension $x^5$ which is adapted to come into contact with downward extensions $x^6$ of the pawls $x^7$. There are as many of these pawls as there are idle wheels Q; they are mounted on a shaft $x^8$, carried by the uprights $M^5$ $M^6$, and are normally held in position to lock the idle wheels by springs $x^{11}$. Extending from each of the pawls $x'$ at its right hand side is a pin $x^2$ which is adapted to make contact with the dog $x^3$ of the pawl to the right when it is released. Extending from the front plate Y of the carriage is a stop $y^{38}$ which is adapted to make contact with the pawls $x'$ when they are thrown rearwardly by mechanism to be hereinafter described. Secured in the uprights $M^5$ and $M^6$ is a rod $x^9$ which limits the forward movement of the pawls $x'$. The pawls $a'$ are held in their normal position by springs $x^{10}$ which are attached at one end to these pawls and at the other end to the rod $d^{13}$.

On the left hand end of the adding wheel shaft S is a spur wheel $s^{10}$ through which projects the rounded end of the projection $s^6$ hereinbefore referred to. Journaled on the shaft $n'$ is an arm $n^4$ provided with a toothed segment $n^5$, which engages with the spur wheel $s^{10}$. On the arm $n^4$ is a pin $n^6$ which works in an L-shaped slot $z^5$ in the lever Z, which I term the total key lever. This lever Z is pivoted at its rear end to the frame $M^4$ and is provided at its front end with a key $z^7$. On the lever Z is a downward extension $z^8$. This downward extension has its lower end beveled and is adapted to force the projection $s^6$ of the comb $s^5$ inwardly. Pivoted to the arm Z is a plate $z^{10}$ in which is an opening $z^{11}$, through which extends a pin $z^{12}$ in an arm $z^{13}$ which is pivoted on the idle wheel shaft $Q'$. Formed integrally with the arm $z^{13}$ is an arm $z^{14}$, which is connected to a link $z^{15}$, by means of a screw $z^{16}$, which passes through a slot $z^{17}$ in the link. Pivoted to an upward extension in the frame $M'$ is a hook $z^{18}$ which is adapted to engage with a pin $z^{19}$ on the link $z^{15}$, and thus hold the arm $w^5$ in its forward position. The hook $z^{18}$ is pulled downward by a spring $z^{21}$, which is attached at one end to the hook and at the other end to the frame $M'$. The downward movement of the hook $z^{18}$ is limited by a stop $z^{22}$ which works in a curved slot $z^{23}$ in the hook. In the plate $z^{10}$ is a vertical slot $z^{25}$ which works on a pin $z^{27}$. A link $z^{29}$ is connected to the plate $z^{10}$ by a pin $z^{30}$ passing through the extension $z^{26}$ of the slot $z^{25}$ into the arm $z^{28}$, which is pivoted on the upright $M^5$ by the pin $z^{27}$ which also passes through the slot $z^{25}$. The other end of the link $z^{29}$ is pivoted to an arm $z^{31}$ which is rigidly secured to the shaft X of the order stop pawls.

*Means for returning the carriage.*—On the frame $M'$ is a lug $m^{13}$ to which is pivoted an arm $y^{41}$,—the end of which is secured to an extension $y^{42}$ of the carriage Y $Y'$. This arm appears in dotted lines in Fig. 12, being above the plane of the section. The arm $y^{41}$ is pulled toward the left by a spring $y^{44}$,—one end of which is secured to the arm and the other to the frame. Extending downwardly from the arm $y^{41}$ is a pin $y^{45}$. On the shaft $d^7$ is a cam $d^{16}$ which is adapted to engage with the pin, thus forcing the arm $y^{41}$ to the right, which through the extension $y^{42}$ draws the carriage to its extreme position at the right. Formed integrally with the arms $z^{13}$ and $z^{14}$ is an arm $z^{32}$, which is pivoted to a link $y^{46}$,—the lower end of which is secured to the lever $y^8$ by means of a screw passing through a slot $y^{47}$ in the link.

*Operation of the computer.*—When one of the order keys $d'$ is depressed by means of the actuator, under the influence of the tabulator on the typewriter, as explained, the rear end of the corresponding key-lever $d^3$ becomes elevated, thus raising the bar $d^{17}$ and consequently swinging the rear ends of the arms $d^5$ and $d^{26}$ upward. As the rear end of the arm $d^5$ engages with the L-shaped lever $y^8$ the said lever will be swung on its pivot, and the dogs $y^5$ and $y^7$, Fig. 19, raised out of engagement with the ratchet bar $y'$ by means of the pin $y^9$. This will release the carriage, which, being under the influence of the spring $y^{44}$, will move from its normal position at the right, as shown in Fig. 26, toward the left until it strikes the bar $d^3$, that has been elevated by the depression of the order-key which thus determines the position of the carriage. The carriage, being connected by the arm $y^{11}$ to the collar $r^6$ moves the collar longitudinally on the shaft $r$ and brings the master-wheel R into engagement with the idle wheel Q in the order corresponding to the order-key struck. For the purpose of preventing the premature return of the order-key bar $d^3$ to its normal position, which would allow the carriage to move to its extreme position at the left, the catch $d^9$ is provided: This catch taking into the recess in the upward extension of the order-key bar, holds the said bar in its raised position until the pin $y^{21}$, which is moving slightly in advance of the stop $y^3$, strikes the order-key bar, thus through the plate $y^{20}$ pressing the catch toward the front of the machine and releasing the bar. The master wheel R now being in engagement with the idle wheel Q of the desired order, according to the order key operated, the registering key, corresponding to the figure in the left hand order of the number to be registered, is depressed by the actuator, energized by the closing of the circuit by numeral key on the typewriter.

The depressing of the registering key elevates the rear end of the registering key bar $d^6$ to which it is attached. As the rod $u$ rests upon the registering bars, the elevation of the bar swings the front end of the frame U upwardly. This movement brings the rack $u'$ into engagement with the spur-wheel $t^{10}$ and at the same time withdraws the dog $u^3$ from the ratchet-wheel $t^9$ and thus releases the motor. As the motor is now free to act, it revolves the ratchet-wheel $t^9$ and spur wheel $t^{10}$ in the direction of the arrow in Fig. 11, thus driving the rack $u'$ forward along the frame U until the stop $u^2$ comes in contact with the end of the registering key-bar which has been elevated. The length of the registering key bar thus determines the distance through which the rack $u'$ can move, and consequently the amount of revolution of the spur-wheel $t^{10}$. The spur wheel $t^{10}$ being in engagement with the spur-wheel $r^4$, rotates it proportionally to the registering key depressed. As the master wheel R cannot rotate independently of the shaft $r$ to which the spur wheel $r^5$ is secured, it will also be rotated proportionally to the registering key depressed. The master wheel being in engagement with the idle wheel Q in the left hand order of the number to be registered will rotate the idle wheel and thus position the indicating wheel P in the same order, and also rotate the corresponding adding wheel $s^3$ proportionally to the registering key depressed. As the pin $y^{18}$ rests upon the bar $u$ the lever $y^6$ is swung upwardly when the frame U is raised. This throws the dog $y^7$ to the left sufficiently to take into the next notch to the left on the ratchet bar $y'$. As the registering key is released and the frame U lowered, the lever $y^6$ is drawn back to its normal position by the spring $y^{24}$. This forces the dog $y^7$ toward the right, and consequently moves the carriage one order, bringing the master wheel R into engagement with the next idle wheel Q to the right. The above operation of depressing the registering keys is repeated for the various digits in the successive orders to be added.

After the registering keys have been depressed to register the number, as above described, the handle D' is pulled forward and downward. During the first movement of the handle, the rotation of the shaft $d^7$ draws down the link $w^{13}$ by means of the arm $w^{12}$. As soon as the screw $w^{14}$ reaches the lower end of the slot $w^{15}$, the downward movement of the link $w^{13}$ will be communicated to the arm $w^5$. As the arm $w^5$ moves downwardly it will swing the arm W on the pivot $w^7$ and move the toothed segment $w^4$ in the direction of the arrow in Fig. 13. This rotates the spur wheel $q^6$ in the direction shown by the arrow. This spur wheel being rigidly secured to the shaft Q' of the idle wheels Q rotates the shaft in the same direction. The idle wheels of all the orders in which significant numbers have been registered will be rotated by the contact with the pins $q^3$, Figs. 11 and 23 of the teeth of the comb $q'$. As the shaft is rotated the teeth of the comb $q'$ will come in contact with the pins $q^3$ and bring them to their normal position, thereby bringing the indicating wheels to zero.

As the shaft $n'$ is rotated, by the arm $w^{12}$, the link $n^7$ and the arm $n^8$ (Fig. 13), the frame N is swung upwardly, so as to take the adding wheels $s^3$ out of engagement with the idle wheels Q and put them into engagement with the teeth $v'$ on the carrying bars V. This prevents the adding wheels from being disturbed when the idle and indicating wheels are brought to zero, and also brings them into position to be acted on by the carrying bars, as will be hereinafter described. As the numbers to be added are registered in the machine, the adding wheels $s^3$ will be continuously rotated as above described. Whenever one of the adding wheels $s^3$ has been moved more than nine places,—that is, makes more than half a revolution,—one of the teeth $s^7$ on the said adding wheel will come in contact with the inclined portion of the downward projection $v^2$ of the pawl V' upon the corresponding carrying bar. This will force the forward end of the pawl upwardly and depress the rear end. As the rear end of the pawl V' rests upon the pin $v^6$ of the pawl $v^4$, which locks the next carrying bar to the left, the downward motion of the rear end of the pawl V' will force the pawl $v^4$ downwardly and so unlock the carrying bar of the next higher order, which will be thrown backward by the spring $v^5$. The backward movement of the carrying bar V will be limited by the contact of its downward extension $v$ with the shaft $n'$.

The further rotation of the shaft $n'$ brings the blade $n^2$ into contact with the downward extensions $v$ of any of the carrying bars which have been released and forces these carrying bars forward, thus moving the corresponding adding wheel one space. The bars will be retained in their position by engagement with the pawls $v^4$. In case a carrying-bar is released when its adding wheel is at "9" the downward projection $v^2$ of its pawl will strike upon the tooth $s^7$ and be tripped in the same manner as if the adding wheel were moved one space and so disengage the next pawl to the left from its carrying bar and so position said carrying bar for carrying. It will be seen from this that if all the adding wheels were at "9" and one were added in the units order, all the bars would be released for carrying.

If the carriage has not been completely returned to its position on the right, as is the case when one or more zeros are at the right hand end of the number registered the cam $d^{16}$ will engage with the pin $y^{45}$ upon the arm $y^{41}$ and thus return the carriage to its normal position. As soon as the handle is moved the link $w^{13}$ will be forced upward; but it will not affect the link $w^5$ until the screw $w^{14}$ has reached the upper end of the slot $w^{15}$ when the arm $w^5$ will be forced upwardly, thus rotating spur-wheel $q^6$ in the opposite direction to the arrow in Fig. 13. This will rotate the shaft Q' and bring the comb $q'$ into its normal position.

During the operation of the registering keys the motor will be more or less unwound, depending upon the number and value of the keys depressed. This will rotate the disk $t^{15}$ and thus move the projection $t^{16}$ around toward the pin $t^{17}$. As soon as the handle D' is operated the pulley $t^{14}$ will be rotated in the opposite direction to the unwinding of the motor. As soon as the pin $t^{17}$ comes in contact with the projection $t^{16}$ on the plate $t^{15}$ the rotation of the pulley $t^{14}$ will wind the motor. It will be seen from this that each time the handle is pulled, the motor will be wound up just as much as it has run down during the registering of the number. The ratchet wheel $t^3$ allows the motor to be wound up without affecting the spur wheel $t^4$ which is locked against movement by the ratchet wheel $t^9$ and dog $u^3$.

When it is desired to take the total of the numbers registered in the machine, the total key $z^7$ is depressed to swing the bar Z on its pivot. The first movement of the bar forces the extension $s^6$ of the comb $s^5$ to the right by the action of the inclined end of the projection $z^8$ into a position to engage with the inner ends of the teeth $s^7$ on the adding wheels. During the same time the downward movement of the plate $z^{10}$ through the link $z^{29}$ and arm $z^{31}$ rotates the shaft X, so as to throw the pawls $x'$ to the rear, in such position that the rear ends of these pawls will be in the path of the stop $y^{38}$, and the projections $x^5$ of the dogs $x^3$ will be in proximity to the downward extensions $x^6$ of the pawls $x^7$. During the first part of the movement of the lever Z the arm $n^4$, carrying the tooth segment $n^5$ will not be affected, owing to the downward extension of the slot $z^5$; but as soon as the pin $n^6$ has reached the upper end of the slot $z^5$, the said arm and segment will be swung on the pivot, moving the spur wheel $s^{10}$ in the direction of the arrow in Fig. 15. This will rotate the shaft S and bring the teeth of the comb $s^5$ into engagement with the teeth $s^7$, thus bringing the adding wheels $s^3$ into their normal position. This will transfer the amount on the adding wheels to the indicating wheels; but the indicating wheels will be rotated in the opposite direction to that in which they are rotated when registering a number. As the indicating faces are arranged from "1" to "9," on each side of the "0" on the indicating wheels, it will be seen that this opposite movement will bring the indicating wheels into the proper position. It is to be remembered that the master wheel has moved to the right a sufficient distance to be out of engagement with the last idle wheel to the right, and hence does not interfere with the rotation of that wheel while transferring the sum.

As the shaft S is rotated and the numbers are being transferred from the adding wheels through the idle wheels to the indicating wheels, whenever an idle wheel is rotated the rear end of its locking pawl $x^7$ will be forced downward, which will bring the downward extension $x^6$ of this pawl against the projection $x^5$ on the dog $x^3$ of the corresponding order stop pawl, and thus release that pawl, and, as has been previously described, all those to the right of it, so that they may be swung forward into their normal position by the springs $x^{10}$. It will be seen from this that when the complete sum has been transferred from the adding to the indicating wheels, all the order stop pawls $x'$ to the right of the highest order in the sum will be in their forward position, while only those to the left will remain in their rear position.

On the upward movement of the lever Z the shaft S and comb $s^5$ are returned to their normal position, and the order-stop pawl shaft is also returned to its normal position, taking with it any of the pawls which have not been tripped. The handle is now actuated in the same manner as when registering a number. The first movement of the handle draws down the arm $w^5$ by means of the link $w^{13}$. The arm $w^5$ being now in engagement with the pin $w^{16}$ instead of the pin $w^{10}$, the spurwheel $q^6$ will be rotated in the opposite direction and the bringing of the wheels to zero thus effected. The return of the carriage to its normal position is accomplished in the same manner as after indicating a registered number.

I claim:

1. A computing mechanism arranged with a controller having two sets of actuating devices, means operated by one set to select the columns, and means operated by the other set to determine the digits within those columns, combined with a typewriter having a tabulating device and numeral keys, and connecting mechanism between the tabulating device and the column selecting mechanism of the computer and between the numeral keys and the digit selecting mechanism of the computer.

2. The combination of a typewriter having numeral keys and a tabulating mechanism adapted to select column positions, a computing machine having a set of members for determining the columns, and another set for determining the digits in the column, two sets of electro-magnets for controlling said members respectively, and electric connections between said tabulating mechanism and the first set of electro-magnets and between the numeral keys of the typewriter and the second set of electro-magnets.

3. The combination of a typewriter having numeral keys and tabulating mechanism adapted to select column positions, a computing machine having two rows of keys, one for determining the columns and the other for determining the digits in the column, and connecting mechanism between the tabulator mechanism of the typewriter and the first-mentioned row of keys of the computer, and between the numeral keys of the typewriter and the second mentioned row of keys of the computer.

4. A typewriter provided with a carriage and having a tabulating device adapted to arrest the movement of the carriage at various points for different columns, combined with a computing mechanism having a set of selecting keys for determining the column to begin the computation and connecting mechanism between the tabulator and the selecting keys.

5. The combination of a typewriter provided with a carriage and a tabulating device carried thereby and including a notched guard plate, and a detent adapted to engage with the various notches thereof, and thereby determining the position of temporary stoppage of the carriage, electric conductors connected with the detent and with individual portions of the guard plate; a computing mechanism having column-selecting members; and electro-magnets for operating said members connected with the conductors.

6. The combination of a typewriter provided with a carriage and having a stepped bar, a suitable stop adapted to engage the bar and thereby temporarily stop the carriage at various points, mechanism for setting said bar and thereby establishing a circuit dependent upon which step of the bar is in engagement, a computing mechanism, and mechanism for selecting the proper column to begin the computation according to the circuit selected by the positioning of the setting bar upon the typewriter.

7. The combination of a computing mechanism having two sets of keys, one adapted to select the proper column for beginning the computation and the other to select the proper digit in each column, two sets of electro-magnets, armatures operated thereby and connected to cause the control of the keys of the computing machine, a typewriter having numeral keys and a tabulating device, electric circuits leading from the numeral keys on the typewriter to one set of said electro-magnets and from the tabulator to the other set, said circuits being individual to one side of the magnets and having a common return from the other side, and a switch in said common return.

8. The combination of a typewriter having a traveling carriage; a guide; a flexible cable running from said carriage over said guide; a take-up device for said cable; a computing mechanism; and a stationary electro-magnetic controller for said computing mechanism to which the cable leads, electrically connected with said cable to enable said controller to be actuated from any position of the carriage.

9. The combination of a typewriter having a traveling carriage, said carriage having numeral keys and a tabulator; a stationary computing mechanism having two sets of controlling members, one for determining the columns and the other for determining the digits in the columns; a set of actuating mechanisms for each set of controlling members; and two sets of electric circuits, one leading from the numeral keys and the other from the tabulator of the typewriter carriage to said actuating mechanisms to enable the latter to be operated from any position of the carriage.

10. The combination of a typewriter having a traveling carriage, said carriage having numeral keys and a tabulator; a stationary computing mechanism having two sets of controlling members, one for determining the columns and the other for determining the digits in the columns; a set of actuating mechanisms for each set of controlling members; two series of electric circuits, one leading from the numeral keys and the other from the tabulator of the typewriter carriage to said actuating mechanisms to enable the latter to be operated from any position of the carriage, said circuits being all collected together into a flexible cable; a guide for said cable; and a device for taking up the slack of said cable during the travel of the carriage.

11. The combination with a frame, a traveling carriage, and printing mechanism movable with the carriage and including numeral keys, of a computing device, means controlling the position of the carriage, an actuator presentable to the computing device by reason of the carriage being properly positioned by such means, and means for automatically connecting the actuator with the numeral keys when so presented, said last-named means comprising key-operated members mounted on the carriage.

12. The combination of a stationary computing device; a carriage traveling in one direction for letter-spacing, and in a direction at right angles thereto for line-spacing; numeral keys on said carriage; tabulating means for selecting the position of the carriage; individual flexible connections extending from the numeral keys to the computing device to enable the former to operate the latter from any position of the carriage; and a device controlled by said tabulating means for governing such operation of the computing device according to the selected position of the carriage.

13. The combination, with a computing device and a controller stationarily mounted with respect thereto; of a carriage traveling in one direction for letter-spacing, and in a direction at right angles thereto for line-spacing; numeral keys mounted upon said carriage; a device for positioning the carriage; and individual flexible connections leading from the keys to the controller to enable the former to operate the latter from any position of the carriage, said controller also having a flexible operating connection leading thereto from the carriage-positioning means.

14. A computing typewriter combining a carriage, numeral keys, an escapement device for said carriage controlled by said keys, a computer having a traveling actuator, a mechanism for controlling the operation of said computer mounted on said carriage and operated by the numeral keys, and means operated by said controlling mechanism consequent upon the operation of said keys for effecting the step-by-step advance of said actuator, whereby the numeral keys may cause the typewriter carriage and the actuator to advance step by step simultaneously.

15. A book typewriter having numeral keys and letter keys mounted on a laterally movable key board in combination with a computing mechanism, a connection between the computing mechanism and the key board arranged to connect the numeral keys with the computer, and a tabulator comprising a stepped block and an operating lever mounted on the carriage of the key board and adapted to determine the lateral position the carriage is to take and automatically select the order of the computer in accordance therewith but independently of the actual position of the carriage, the carriage having lateral movement in excess of that corresponding to the computing orders.

16. A computing typewriter combining a frame, a traveling carriage thereon, printing mechanism mounted on the carriage and including letter keys and numeral keys adapted to cause the printing of any desired words and figures, a computing device comprising a relatively movable master wheel and digit wheels, means for controlling the operation of the computing device partly mounted on the carriage in operative engagement with the numeral keys, said controlling means effecting a relative traverse of master wheel and digit wheels when the numeral keys are actuated, and means for moving the carriage when either a letter key or a numeral key is actuated.

17. A computing typewriter combining a typewriter frame, a typewriter carriage thereon arranged to travel in one direction for letter-spacing, and in a direction at right angles thereto for line-spacing, numeral keys mounted on the carriage, a tabulating device adapted to position the typewriter carriage, a computer comprising a computing carriage, flexible connections between the typewriter carriage and the computing carriage for positioning the latter denominationally in accordance with that of the former, flexible connections between the numeral keys and the computer for effecting a traverse of the computing carriage step by step simultaneously with and to the same extent as the typewriter carriage during the printing of each item.

18. In a combined typewriting and adding machine, the combination of typewriting mechanism including numeral keys and other keys, printing instrumentalities controlled by said keys for writing any words and numbers, and a carriage movable step by step under the control of said keys; adding mechanism including a denomination determining device, means controlled by the numeral keys for effecting a step by step feed of said denomination determining device simultaneously with the movement of said typewriter carriage during computation, electrical connections between said numeral keys and said adding mechanism, a disconnect key, and means operated by said disconnect key for opening said electrical connections and thereby rendering said first means and said adding mechanism inoperative.

19. The combination, with a set of numeral keys; of computing mechanism comprising a set of computing wheels and a master actuator therefor; a device electrically connected with said computing mechanism and settable for determining the denominational position at which said master actuator shall initially commence action on the computing wheels; and individual electric connections between said numeral keys and said computing mechanism for controlling the extent of operation of the computing wheels to correspond with the particular key actuated.

20. The combination, with a platen, and numeral keys; of a traveling carriage providing relative movement between said platen and keys; computing mechanism comprising a set of computing wheels, and a master actuator therefor; a device mounted on said carriage and electrically connected with said master actuator and settable for initially positioning the latter denominationally with respect to the computing wheels to begin computation; and individual electric connections between said keys and said master actuator, for controlling the extent of rotation of the latter to correspond with the particular key acuated.

21. The combination, with a platen, and numeral keys; of a traveling carriage providing relative movement between said platen and keys, so that numbers may be repeatedly written on the work-sheet in a single horizontal line; computing mechanism comprising a set of computing wheels, and a master actuator therefor; a device mounted on said carriage to travel therewith, and electrically connected with said master actuator to initially position the latter denominationally with respect to the computing wheels each time that a number is to be written in the line of writing and computed; and individual electrical connections between said numeral keys and said master actuator for controlling the extent of operation of the master actuator to correspond with the particular key actuated.

22. The combination, with a set of computing wheels, and a master actuator therefor, said computing wheels and said actuator constituting a pair of companion parts, one of which has a step-by-step movement relative to the other; of a set of numeral keys; a set of electric circuits, one circuit individual to each numeral key, having a common connection with said actuator, to enable any one of said keys to control the extent of operation of the latter; and means controlled by the actuation of said keys through said circuits for effecting the step-by-step movement of said movable part.

23. The combination, with a set of computing wheels, and a master actuator therefor, said computing wheels and said actuator constituting a pair of companion parts, one of which has a step-by-step movement relative to the other; of a platen; printing mechanism comprising both character and numeral keys; a traveling carriage providing relative step-by-step movement between said platen and said keys upon the actuation of any key; a set of electrical circuits, one circuit individual to each numeral key, having a common connection with said actuator, to enable any numeral key to control the extent of operation of said actuator; and means controlled by the actuation of said numeral keys through said circuits for effecting the step-by-step movement of said movable part simultaneously with the stepping of said carriage, said movable part remaining stationary during the actuation of said character keys.

In testimony whereof, I hereunto affix my signature in the presence of two witnesses.

HOLMES MARSHALL.

Witnesses:
H. KOONCE,
JOHN C. LOUD.